(12) United States Patent
Wilbrink et al.

(10) Patent No.: US 7,536,642 B2
(45) Date of Patent: May 19, 2009

(54) METHOD FOR MONITORING COMPUTER USER INPUT

(75) Inventors: Tijs Y. Wilbrink, Voorburg (NL); Edward E. Kelley, Wappingers Falls, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 10/907,722

(22) Filed: Apr. 13, 2005

(65) Prior Publication Data

US 2006/0236236 A1 Oct. 19, 2006

(51) Int. Cl.
G06F 17/00 (2006.01)
G06F 17/20 (2006.01)
(52) U.S. Cl. ....................................... 715/255
(58) Field of Classification Search .......... 715/530, 715/255, 234
See application file for complete search history.

(56) References Cited

U.S. PATENT DOCUMENTS

| | | | | |
|---|---|---|---|---|
| 5,119,493 | A * | 6/1992 | Janis et al. | 718/101 |
| 5,333,302 | A * | 7/1994 | Hensley et al. | 714/37 |
| 6,115,680 | A * | 9/2000 | Coffee et al. | 702/187 |
| 6,356,859 | B1 * | 3/2002 | Talbot et al. | 702/188 |
| 6,380,924 | B1 | 4/2002 | Yee et al. | |
| 6,418,471 | B1 * | 7/2002 | Shelton et al. | 709/227 |
| 6,622,116 | B2 | 9/2003 | Skinner et al. | |
| 6,742,030 | B1 | 5/2004 | MacPhail | |
| 2002/0174134 | A1 | 11/2002 | Goykhman | |
| 2003/0132957 | A1 | 7/2003 | Ullmann et al. | |
| 2004/0002996 | A1 | 1/2004 | Bischof et al. | |
| 2004/0019518 | A1 | 1/2004 | Abraham et al. | |
| 2004/0068559 | A1 | 4/2004 | Shaw | |
| 2004/0100507 | A1 | 5/2004 | Hayner et al. | |
| 2004/0111488 | A1 | 6/2004 | Allan | |
| 2007/0128899 | A1 * | 6/2007 | Mayer | 439/152 |

OTHER PUBLICATIONS

Isokoski, Poika, "Text Input Methods for Eye Trackers Using Off-Screen Targets", ACM, 2000, pp. 15-21.*
Hilbert et al., "Extracting Usability Information from User Interface Events", ACM, 2000, pp. 384-421.*
Cowley et al., "Glass Box: Capturing, Archiving, and Retrieving Workstation Activities", ACM, 2006, pp. 13-18.*

* cited by examiner

*Primary Examiner*—Doug Hutton
*Assistant Examiner*—James J Debrow
(74) *Attorney, Agent, or Firm*—George R. McGuire; Bond, Schoeneck & King, PLLC

(57) ABSTRACT

Monitoring text input from a keyboard and from a pointing device, is done by monitoring input from a user keyboard for entry of text and cursor controls; monitoring input from a pointing device; logging keyboard entered text to a key log; and responsive to input selectively from the pointing device and keyboard selectively signaling a command action, determining text contents of the command action and logging the text contents to the key log in sequence with the keyboard entered text. A temporary storage is provided for storing copied content, and for storing pointing device input device definitions and key command definitions for each application. A log file stores a key log table for each application; and a key logger stores to the key log table entered text reconstructed with reference to the pointing device position, the copied content, the pointing device input device definitions, and the key command definitions.

5 Claims, 12 Drawing Sheets

| APPLICATION | SESSION | SESSION ID | TEXT LOGGED | START TIME | END TIME | CURSOR POSITION | MOUSE ACTION |
|---|---|---|---|---|---|---|---|
| NOTES | | 001 | | 8:00 AM 08/08/2004 | 8:02 AM 08/08/2004 | | |
| MOZILLA | MAIN NAVIGATOR | 002 | WWW.WHITEH | | | BEFORE IP: N/A AFTER IP: N/A | OPEN NEW SESSION 003 |
| MOZILLA | WWW.AMEX.COM | 003 | | 8:02 AM 08/08/2004 | 8:04 AM 08/08/2004 | BEFORE IP: N/A AFTER IP: N/A | OPEN NEW SESSION 004 |
| MOZILLA | WWW.HOTMAIL.COM | 004 | MARY@HOTMAIL.COM | 8:03 AM 08/08/2004 | 8:20 AM 08/08/2004 | BEFORE IP: N/A AFTER IP: N/A | SWITCH TO SESSION 002 |
| MOZILLA | MAIN NAVIGATOR | 002 | OUSE.ORG | 8:13 AM 08/08/2004 | 8:15 AM 08/08/2004 | BEFORE IP: "WWW.WHITEH" AFTER IP: N/A | SWITCH TO SESSION 004 |
| MOZILLA | WWW.HOTMAIL.COM | 004 | HI MARY! I'VE DECIDED TO POSTPONE OUR MEETING | 8:03 AM 08/08/2004 | 8:20 AM 08/08/2004 | BEFORE IP: N/A AFTER IP: N/A | MOVED INTO FORM MB AT 0,-270; ACTION: SEND AT-20,300 |

FIG. 8

METHOD FOR MONITORING COMPUTER USER INPUT

BACKGROUND OF THE INVENTION

1. Technical Field of the Invention

This invention relates to computer systems, and more particularly to tracking user input using both keyboard and mouse.

2. Background Art

Keyboard monitoring serves the primary purpose of tracking what a user is doing on his computer.

There exist system tracking devices that monitor every key entered on a user keyboard. However, such tracking devices do not monitor what is done with the mouse, resulting in an information gap. There is, therefore, a need in the art for a system and method for monitoring all text input both from a keyboard and also from a mouse.

Copy and paste is an example of a mouse function that enters text but escapes keyboard logging. This results in failure to learn what actions a user is undertaking on the computer, and opens up possibilities for users intending harm to the system such that automated recovery procedures cannot be used. Also, as a user switches from a first to a second application, a conventional key logging system may lose track of the text entered and modified in the first application.

The failure to log mouse functions results, from an informational perspective, in logging only a limited set of data for analysis at a later stage. From a recovery perspective, failure to log mouse functions results in losing the ability to recover routines that were recorded but included an action taken by the mouse, such as pressing enter or selecting another application window.

Keyboard logging may be used in many ways. For example, it may be used by information agencies to track activities of suspects, by applications that track keys entered by a user, often without his knowledge, to feed back data for marketing purposes over the Internet, or in recording macros within an application, such as the Lotus 1-2-3™ spreadsheet application. While some logging of mouse actions is available within such an application when recording a macro while running the application, the system does not recognize actions taken outside of the running application. Thus, there is a need to provide a tracking mechanism that tracks keyboard and mouse actions beyond that built within a single application.

SUMMARY OF THE INVENTION

A system and method for monitoring text input from a keyboard and from a pointing device, by monitoring input from a user keyboard for entry of text and cursor controls; monitoring input from a pointing device; logging keyboard entered text to a key log; and responsive to input selectively from the pointing device and keyboard selectively signaling a command action, determining text contents of the command action and logging the text contents to the key log in sequence with the keyboard entered text. Other features and advantages of this invention will become apparent from the following detailed description of the presently preferred embodiment of the invention, taken in conjunction with the accompanying drawings.

BRIEF DESCRIPTION OF THE DRAWINGS

FIG. 8 illustrates a key log structure with fields for applications and sessions.

DETAILED DESCRIPTION OF PREFERRED EMBODIMENTS

In accordance with preferred embodiments of the invention, a system and method is provided for tracking mouse movements and actions, and for integrating monitoring of keyboard input with input of a pointing device, such as a mouse, when either the keyboard or pointing device is employed to cut and paste or copy and paste. When the copy or paste activity occurs, the beginning and ending positions of the copy or paste are determined, the text contents of the activity read, and the results logged in sequence with logged keyboard activities. Logged actions include block and switch actions. Copy, cut, and paste are examples of block actions, and switch actions include change of application and session.

Figure 1:
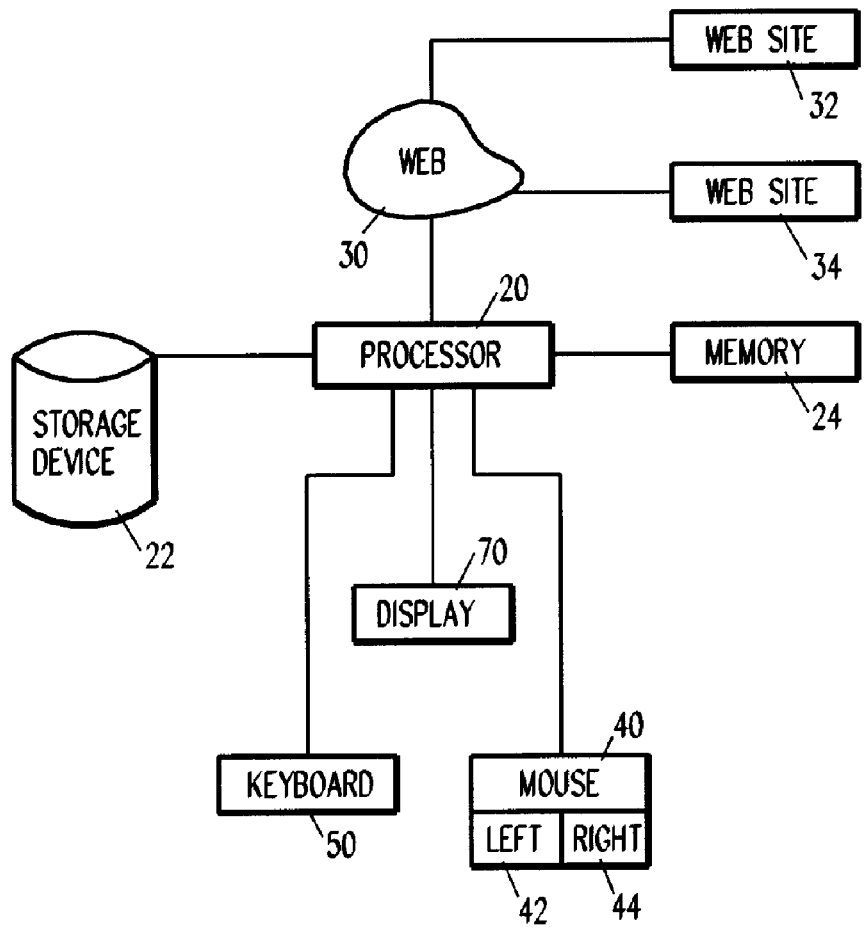
FIG. 1 illustrates a typical system configuration illustrating various Elements of the preferred embodiment of the invention.

Referring to FIG. 1, a user terminal includes a processor 20, storage device 22, memory 24, display 70, keyboard 50, and mouse 40 with left button 42 and right button 44. Processor 20 may be connected through web cloud 30 to a plurality of web sites, including web sites 32 and 34.

Figure 2:
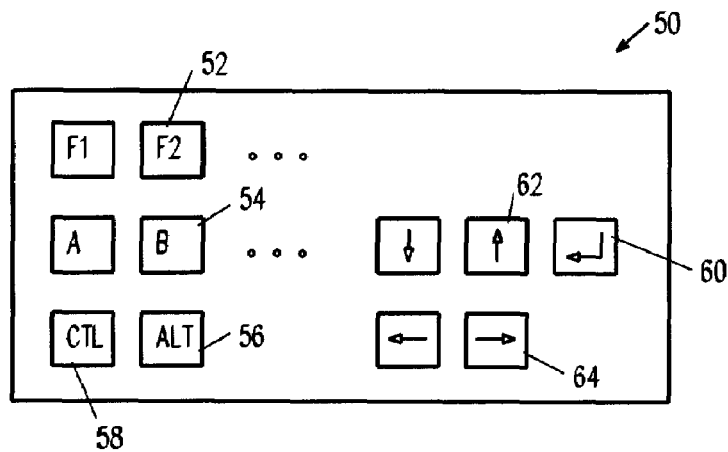
FIG. 2 illustrates a keyboard.

Referring to FIG. 2, a keyboard 50 typically includes a plurality of function keys 52, alpha-numeric keys 54, control key 58, alternate key 56, cursor control keys 62, 64, and an enter key 60.

Figure 3:
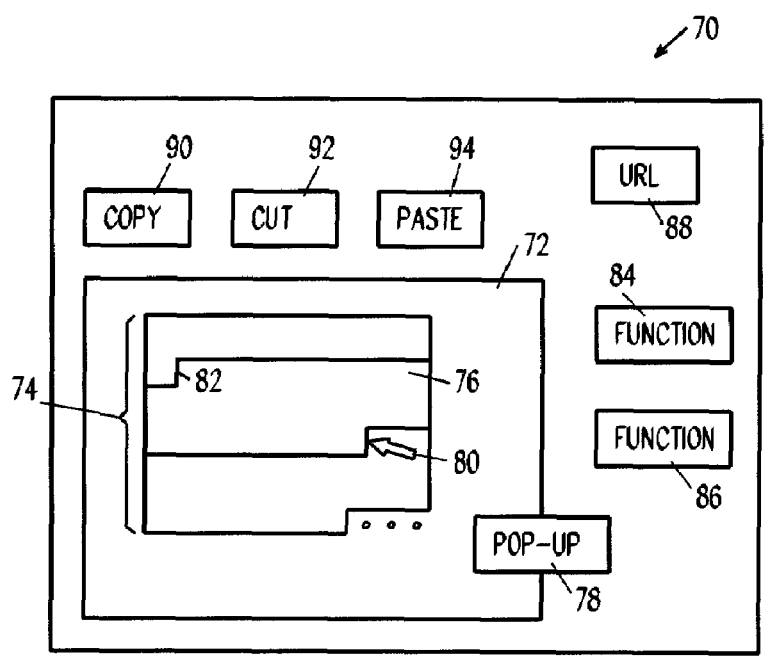
FIG. 3 illustrates a display.

Referring to FIG. 3, a typical display, or graphical user interface (GUI) at display 70 shows icons representing copy 90, cut 92, paste 94 actions (these may also be presented in a drop down list), various other function selection keys 84, 86, pop-up window 78, and an entry panel 74. Cursor 80 may be positioned by moving mouse 40 or by selecting cursor control keys 62, 64 to a beginning position 82 of text 76 to be blocked, and then with enter key 60 held down, moved to a position (as shown) representing the end of block 70. The material 76 thus blocked may then, such as by action of copy 90 or cut 92 be selected, the cursor 80 moved to another location in panel 72, or some other location, and paste button 94, for example, selected to paste the blocked material 76 into a different (if cut) or additional (if copied) location. This FIG. 3 illustrates the positioning of cursor and copy/paste actions on different locations within a single application.

Figure 4:
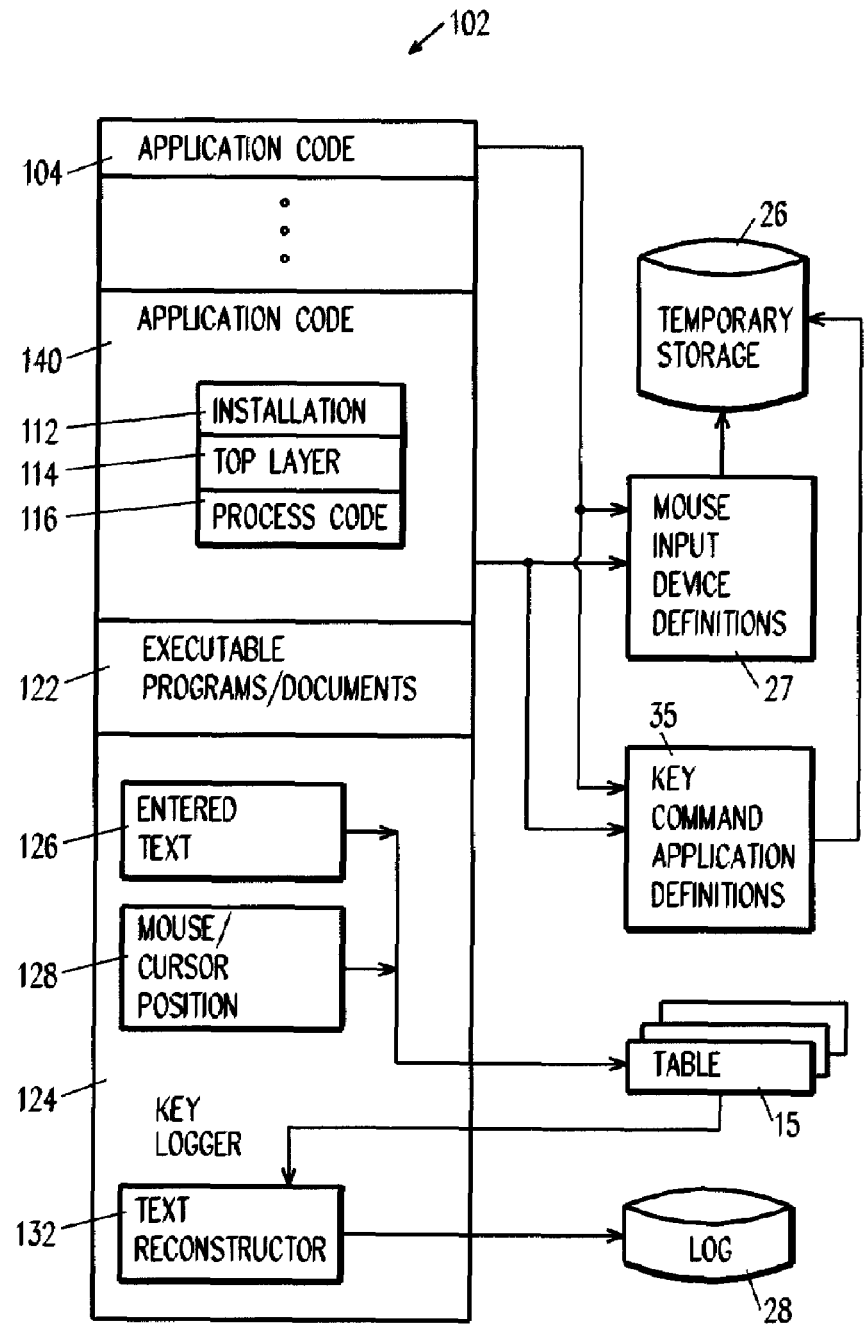
FIG. 4 illustrates code for executing the process of the preferred embodiment of the invention.

Referring to FIG. 4, code 102 includes, in this exemplary embodiment, application code 104, and 140, executable programs and documents 122, key logger function 124 including text 126 entered at keyboard 50, mouse or cursor position information 128, and text reconstructor 132. Application code 140 includes installation component 112, a top layer component 114, and processing code 116. Temporary storage 26 provides storage for mouse input device definitions 27 and key command application definitions 35, and log 28 provides storage for a plurality of tables 15 (before and after their reconstruction by key logger 124).

In operation, the exact movements of mouse 40 need not be logged. Rather, the points in a process where action is taken by the user (the position of cursor 80 when a mouse button 42, 44, or a function key or key combination is selected), or initiated by the system that responds to mouse 80 position and movements, are logged. Thus, for example, a series of web sites 32, 34 that are being accessed or options that are selected during execution of installation code 112 of an application 140 may be logged.

Figure 5:
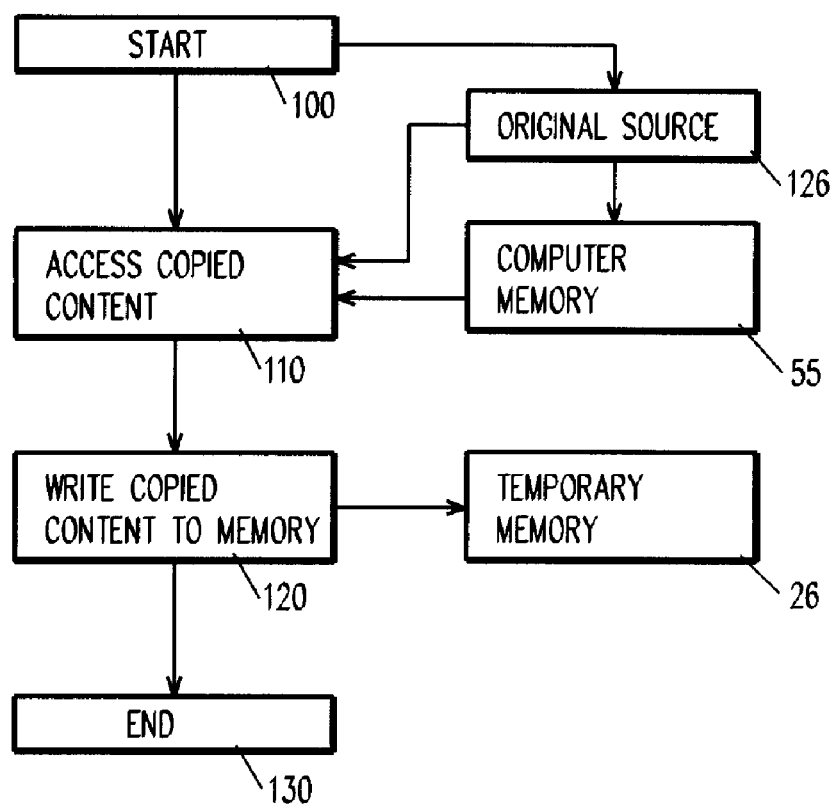
FIG. 5 illustrates initialization and tracking of contents in copy and paste actions.
Figure 6:
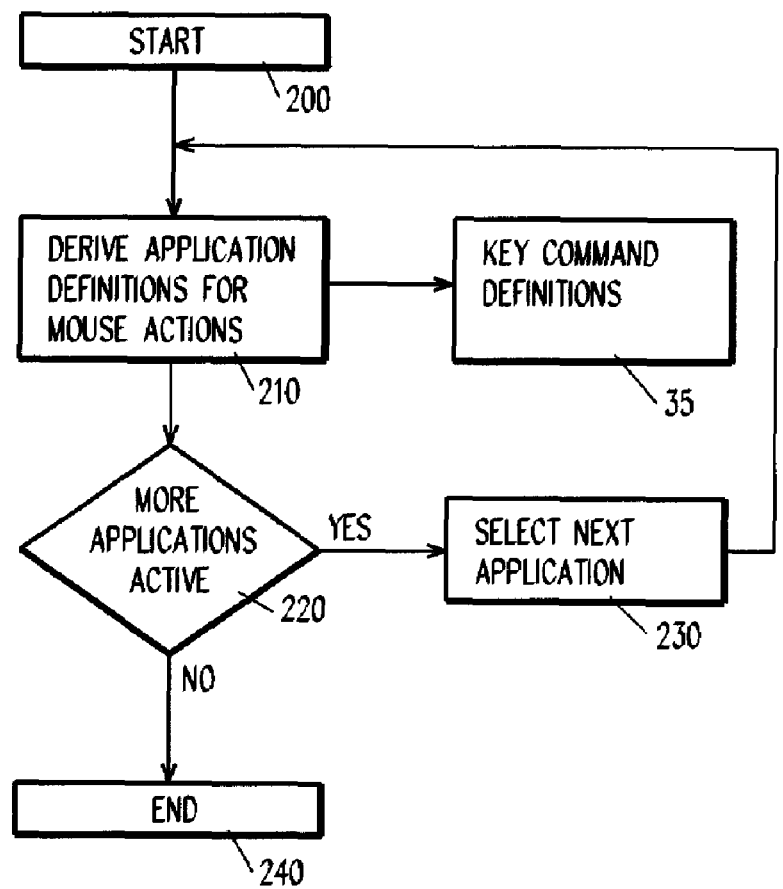
FIG. 6 illustrates identifying or deriving application specific mouse action definitions.
Figure 7A:
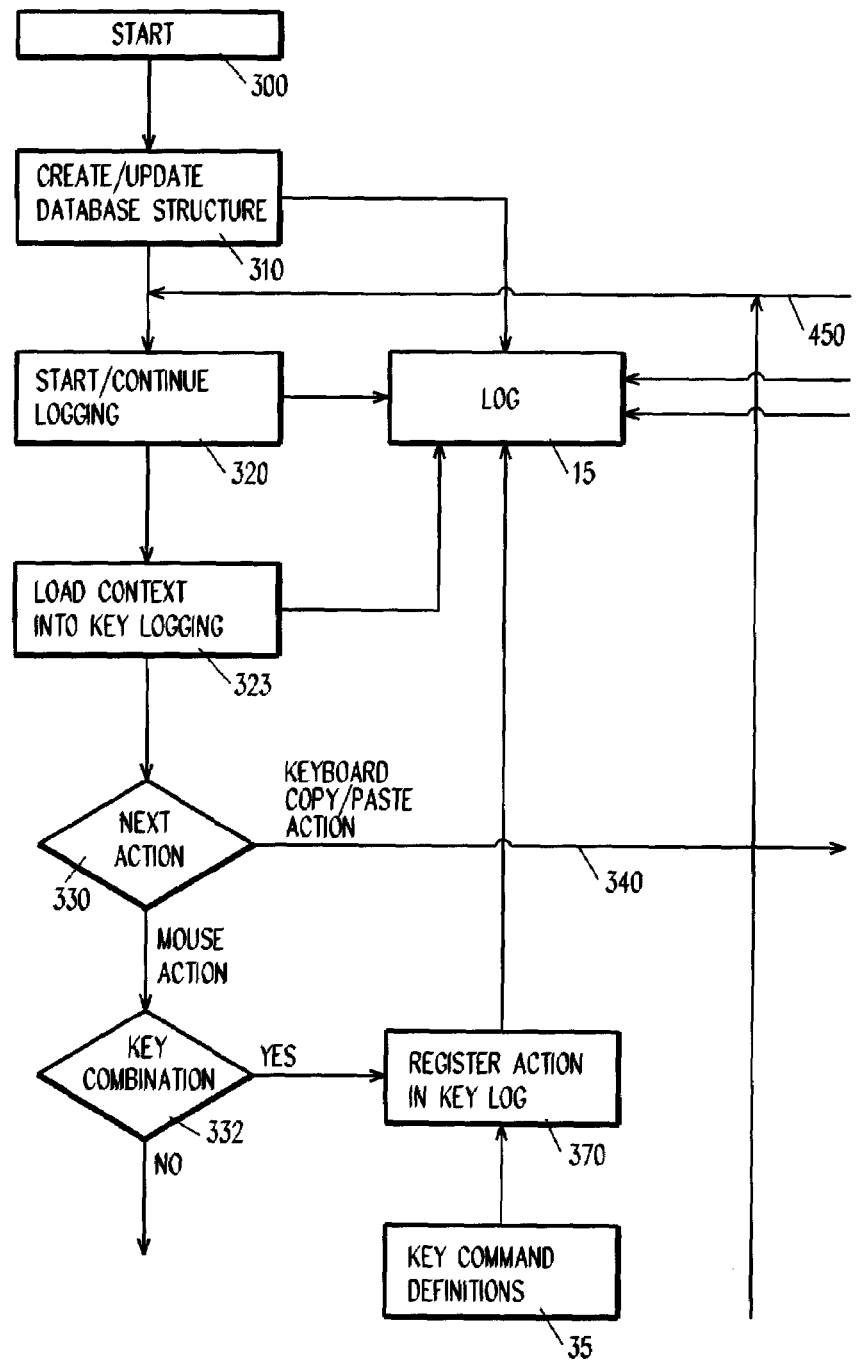
FIGS. 7A, 7B, and 7C illustrate synchronization of key logging and mouse action logging.
Figure 7B:
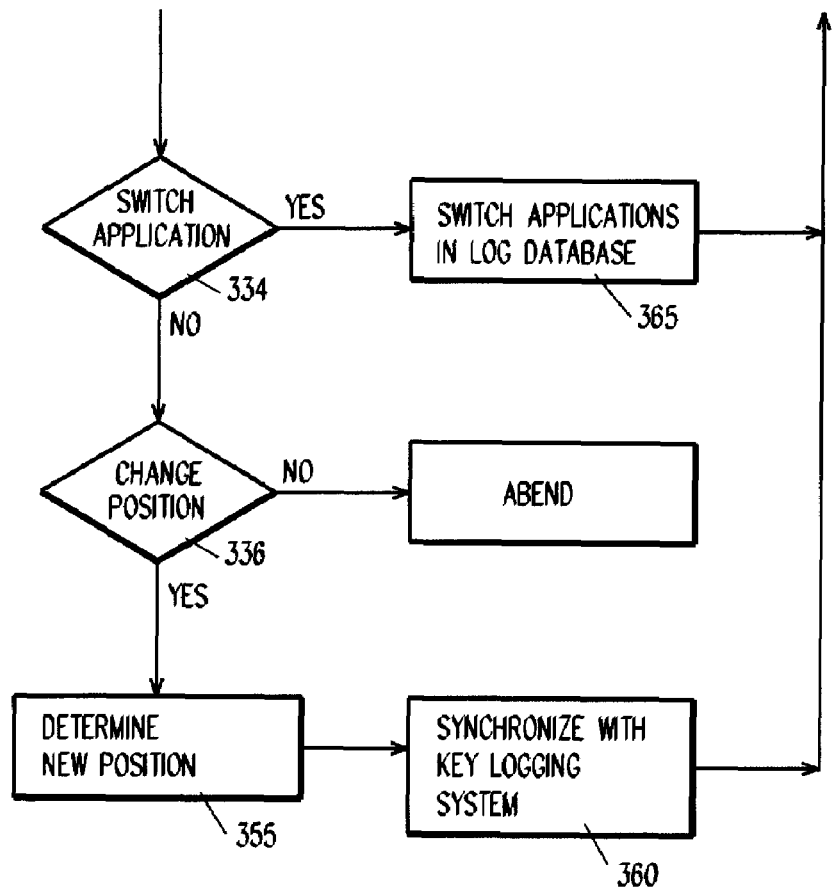
Figure 7:
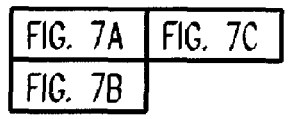
Figure 7C:
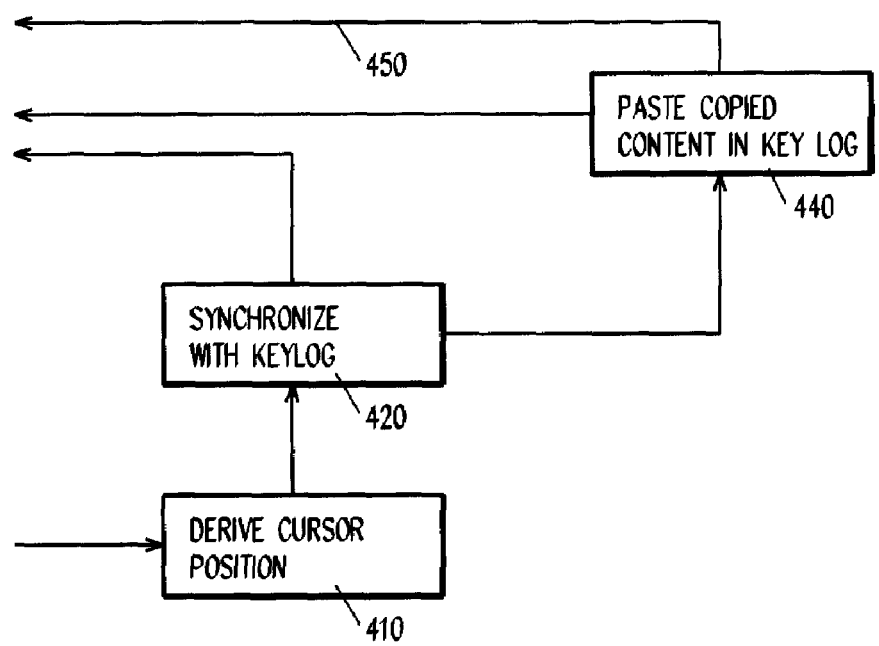
Figure 9:
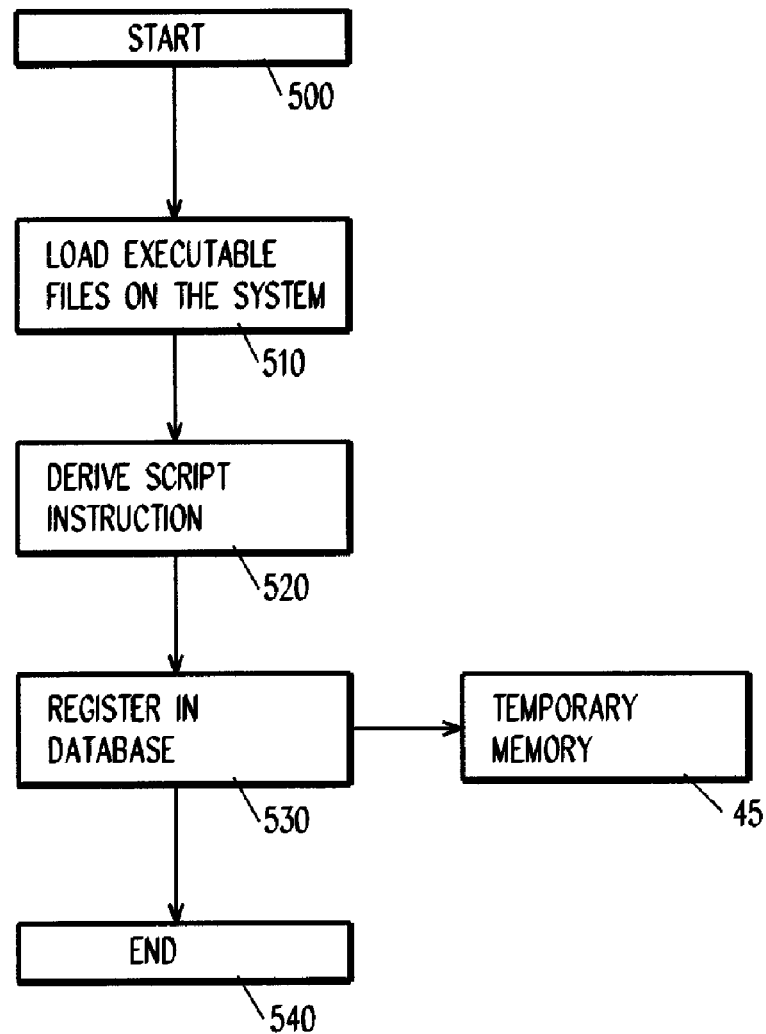
FIG. 9 illustrates translation into script of actions triggered by a mouse.

In broad overview, the preferred embodiments of the invention provide for, first as is illustrated in FIG. 5, logging mouse input device definitions 27 to temporary storage 26; second as is illustrated in FIG. 6, combining key commands with special actions, or key command definitions 35; third as is illustrated in FIGS. 7A, 7B and 7C, selecting executable programs 122 for tracking and identifying currently active applications 104, 140; and finally, as is illustrated in FIG. 9, optionally translating mouse 40 actions into equivalent instructions or script in temporary memory 45.

The definitions of the mouse input device 40, which generally vary over the various applications 104, 140 installed on a system, are gathered into top layer 114 and copied over to be stored in storage 26 as mouse input device definitions 27.

For instance, in some applications the left mouse button 42 is used as an alternative <ENTER> key 60. These definitions have been stored in top layer 114 of the applications and can be accessed or derived through usage of those commands to build definitions 27 in storage 26. This top layer 114 refers to a database (not shown) where keyboard and mouse function definitions are stored for application 140. They are application specific, as simply illustrated by the experience that clicking a mouse button may result in different actions in different applications.

The actions that are relevant for an exemplary embodiment of the invention are copy, cut, paste, and insert functions. To derive these functions through usage to build definitions table 27 in storage 26 from top layer 114, at least two different approaches may be used. First, by using the system memory 55 addresses where copied text 76 is stored, and second by using a graphical user interface 70. In the first, when the application requests a memory address that is to be used to temporarily store texts or other information for copy and paste-like functions, the system logs the mouse action prior to the request on that memory address. In the second, text is inserted typically where the cursor is located, resulting in an immediate addition to the user's text in the active document, and thus capturing both paste and insert functions. In both of these approaches, the action by keyboard or mouse prior to that action is captured and is now written to input device definition file 27.

Key commands like copy 90, cut 92 and paste 94 may be combined with special actions 35, and the resulting changes made to the system are stored in key log files 15 in log 28.

Selection by a user of executable programs and documents (like autoexec.bat or windows.com) 122 initiates the tracking of selection using the mouse button. While tracking (that is, keyboard logging) may also be done if such executable programs are not selected, in accordance with the preferred embodiment of the invention, the mouse function is used for tracking. This mouse function tracking is made a separate process 132 from application keyboard logging, and the launching of executables 122 is tracked, inasmuch as the launch of such executable programs 122 is not tracked by known key logging programs, and the functions of the mouse may differ from application 104 to application 140.

In accordance with a preferred embodiment of the invention, identification of the currently active application 140 when text 76 is modified, entered or pasted is maintained in key log tables 15 of log 28. Then, as the user switches from a first 140 to a second application 104, the logging system 124 does not loose track of the text 76 entered and modified in the first application 140. Rather, automatic reconstruction of the text that has been modified, entered, or pasted is made possible, accomplished by key logger 124. For example, a user may have previously escaped the logging of web address entered when breaking up a URL 88 through selecting different applications when entering the URL. Conventional systems would only have tracked, for example, "http://www-.whit" and later on "ehouse.gov". Now, the two may be automatically combined inasmuch as the system is aware of the application 104, 140 that is selected through mouse 40 movements.

In the above example, as will be more fully described in connection with FIG. 8, the URL is typed into one application 140, but in midstream the user selects a different application (say, 104). Doing so would disrupt the logging in conventional key logging systems.

Referring again to FIG. 4, information entered in application 140, includes entered text 126 and cursor position 128. These are collected in table 15, reconstructed in accordance with the present invention in text reconstructor 132, and then the resulting reconstructed table 15 logged to file 28. Thus, in accordance with the present invention, if a user uses a facility such as Mozilla to browse to the www.whitehouse.gov site, and selects another application, such as Lotus 1-2-3 before the complete URL is derived, the active application is typed in table 15 (FIG. 4), and the complete URL reconstructed in log 28 (FIG. 4) as a single action (http://www.whitehouse.gov) in Mozila as distinguished from two separate actions (http://www.whit and ehouse.gov). (FIG. 8 represents an exemplary key log table 15 prior to reconstruction by text reconstructor 132 and subsequent storage to log 28.)

Thus, the final version of the key log occurs in log 28, which is a collection of tables and databases assembled in step 132, using chronological order. This order is 'broken' by putting together pieces of one single action. For example, the action to browse to a new URL "whitehouse.gov" was broken in two. An old log would have listed the two pieces in completely different sections. In accordance with the present invention, the action is listed in the log at the point where the action is taken (that is, not when the typing of "whitehouse-.gov" has started, but when the <enter> button has been selected.)

In accordance with an alternative embodiment of the invention, mouse 40 actions may be translated into instructions that would have resulted in the same action. For example, a program may be launched through using a mouse 40 or cursor keys 62, 64 to activate a button on the desktop 84, 86, and also through entering text in a DOS window 72. Alternatively, mouse actions and their equivalent cursor and enter key combinations may be translated into DOS instructions, thus keeping track of actions that are selected, rather than where a user has clicked.

Referring to FIG. 5, process 100 handles initialization and tracking of contents in copy and paste actions when a user initiates a copy or cut and paste action, such as by pressing <CTRL>+C and <CTRL>+V on his keyboard 50. In step 110 the content 76 copied by the action of step 100 is accessed from computer memory 55 or the original source 126.

In step 120, copied content 76 is written to a temporary memory or database 26, where it may be accessed later on. The copied content 76 is associated with a unique identifier, as there may be other copied contents stored in memory 26, and optionally a reference to the source from which it was copied. In step 130 the process ends.

Referring to FIG. 6, in step 200 the process for identifying or deriving application specific mouse action definitions 27 is started when key logging 124 is enabled on a system that contains a mouse 40 or similar device, such as a mouse pen. When a new application 140 is launched, this process is repeated for application 140 if it has not yet been registered into the system. In step 210, for each application 104, 140 that is active on the user's system 20, the defined actions that can be triggered by mouse 40, which are characteristic for the user application, are derived from the application to allow for logging when the application is in use. These are temporarily stored in the system's assigned memory 26 as key command definitions 35. In step 220, if there are more applications active, the process repeats. In step 230, the next application is selected and in step 240 the process ends.

Referring to FIGS. 7A, 7B, 7C and 8, in step 300 the key logging process 124 is started. Processes initialized in steps 100 and 200 have already run or are initiated when this main process starts in step 300. Step 300 may also execute in response to user selection of executable programs and documents 122, such as autoexec.bat or windows.com.

Referring to FIG. 8 in connection with FIG. 7A, in step 310, a table structure 15 is created in a second database 28 for each application that is active on the user's system to log session and application dependent activities. For Internet sessions, that often use Java pop ups 78 for various purposes, the domain name (or URL 88) is used to identify a single session 142 on a site 32 as one session with the application 140. An example of such an application 140 is a browser, such as Mozilla. This database 28 is updated with a new key log table 15 every time a new application 140 or session 142 loads into memory 24. (See FIG. 10.) In the example of FIG. 8, session 001 is a Lotus Notes session (entry 160), session 002 is a Mozilla main navigator session (entries 162, 168), and session 03 is a Mozilla www.AMEX.co <tÜ> session (entry 164).

Database 28 stores all key log and mouse log information in a table 15 before the information is consolidated for a final log. Specifically, table 15 keeps track of application 140 and session 142 that are active when the user types characters 146 or uses mouse functions 154. Information that is captured includes application 140, session 142, all typed text 146, cursor position 152 when this changes during text insertion, mouse actions 154, time 148 when the application or session is activated and time 150 when it is deactivated, and when the record is closed at application or session end.

In step 320, the user's keystrokes 54 are logged and the results listed in database 28 in a key log table 15 under the header of the current application and session. Previously, the results captured to table 15 can be text only, like in known spyware programs. In accordance with this embodiment of the present invention, the results also include programs and actions that are initiated by mouse actions. These results are shown in much like a logging fashion, such as a logging.txt file (an example of such a .txt file is the keylog table 15 illustrated in FIG. 8) used as a database to log every action of the user when a key logging system 124 is active. In step 320, as is represented by line 450, a logging process from elsewhere may also continue logging, taking output of any of steps 360, 365, and 440.

In step 323 any context 72 that is used by the user is loaded into table 15. This might be a document 126 that the user continues to edit. This is loaded into the key log table 15 to enable tracking of changes to documents 126. If this context would not be included, any changes in a document after changing the cursor's position by using the mouse would not be logged properly.

In step 330, during the entire current session, the system is responsive to actions initiated by mouse 40. If a mouse signal is received by the computer system 20 that is linked to an action either by the active application 104 or the operating system 102, then the meaning of the action is derived from temporary memory 35 in steps 332 and 370 to log the corresponding activity to log 15. Step 330 initiates a subprocess that is executed when a mouse action is detected, which could be at any time during a regular key logging process.

Also in step 330, when a keyboard 50 combination that triggers the copy and paste command is entered, as is represented by line 340, a subprocess is initiated for translating and registering that action into key log 15.

In steps 332, 334, and 336, depending on the meaning of the mouse action detected in step 330, a subprocess represented by one of steps 370, 365, and 360, is started. In this embodiment, a distinction is made in steps 332, 334, and 336 between a mouse 40 action resulting in a specific combination of key and/or text 126 (step 332) entered into the active application 140 and a change in mouse 40 position (step 336) or switching applications 104, 140 (step 334). A change in position (steps 334, 336) may result in different things: switching sessions (step 365), modifying the text (steps 355, 360), or launching a new application. Step 334 provides for switching applications and launching of new applications. The file name and icons that refer to it are registered along with the instruction that executes that file in database 45 (see FIG. 9, step 530). This information is stored in database 45 for access by the logging system to log script instructions that are initiated by the mouse. This database 45 is used to identify the executable program or document from within the computer's operating system.

In step 355 the new position of the cursor 80 is derived based on the text between which an action was enrolled. For instance, the user may previously have entered in (entry 162 of Table 15, FIG. 8) "www.whitehou", and continues to complete the URL with "se.org" (entry 168). "www.whitehou" and "se.org" surround the cursor position and are referred to as the context. This "www.whitehou" is present in the key log database 15 where the key logging process is resumed in step 360. The separation of "www.whitehou" and "se.gov" may occur as the result of a user entering "www.whitehou" in a first application, then going to another application (entries 164, 166) to do another thing, and then returning (entry 168) to the first application to complete entry of the URL by entering "se.gov". In entry 170, the user has returned to session 004 to send message (text logged 146) to Mary, with mouse actions 154 moved into form "MainBody" (MB), at cursor relative position 0, –270 pixels; and action "send", at cursor relative position –20, 300 pixels.

In step 360 the position of the cursor 80 is related to the position within tables 15 of key log 28. The context 72 in which the action was taken is used to locate that same text in database 28 under the present application 140 and session 142. Any new or deleted text 76 will be entered at that same position to stay synchronized.

In step 365, applications 104, 140 in which keys 54 are logged are switched to reference the file 27 of mouse action definitions for the new application 140. It might be that a new application or session is being launched. In this case, key log database 15 is updated with the new application or session. Referring to FIG. 8, for example, this occurs for a session 142 change from session 004 to session 002 at action 166. See also FIG. 9, which provides for converting the launch of executable files into a script format suited for logging into key log 15.

In step 370, if the action triggered by the mouse 40 is a particular key combination, like within a web session, that action is registered in key log 15 using the list of definitions 35 stored in temporary memory 26 by process 200.

Referring to FIG. 7C, a subprocess represented by line 340 executes for logging copy, cut and paste actions. In step 410 the position of cursor 80 is derived, based on the text 72 between which an action was enrolled.

In step 420 the position of the cursor 80 is related to the position within the key log 28. This position is located using the same mechanism as step 410, which is by taking the 'context' 72 in which the action was taken, locating that same text in a key log table 15 under that application and session. Any new or deleted text 76 will be entered at that same position in the relevant table 15 to stay synchronized.

In step 440, the content 76 from the copy and paste action is pasted into the key log table 15 of log file 28 at the earlier identified position. Copied content 76 refers both to content from step 130 and content of the paste command.

In step 450, processing continues to the main process at step 320.

Figure 10:
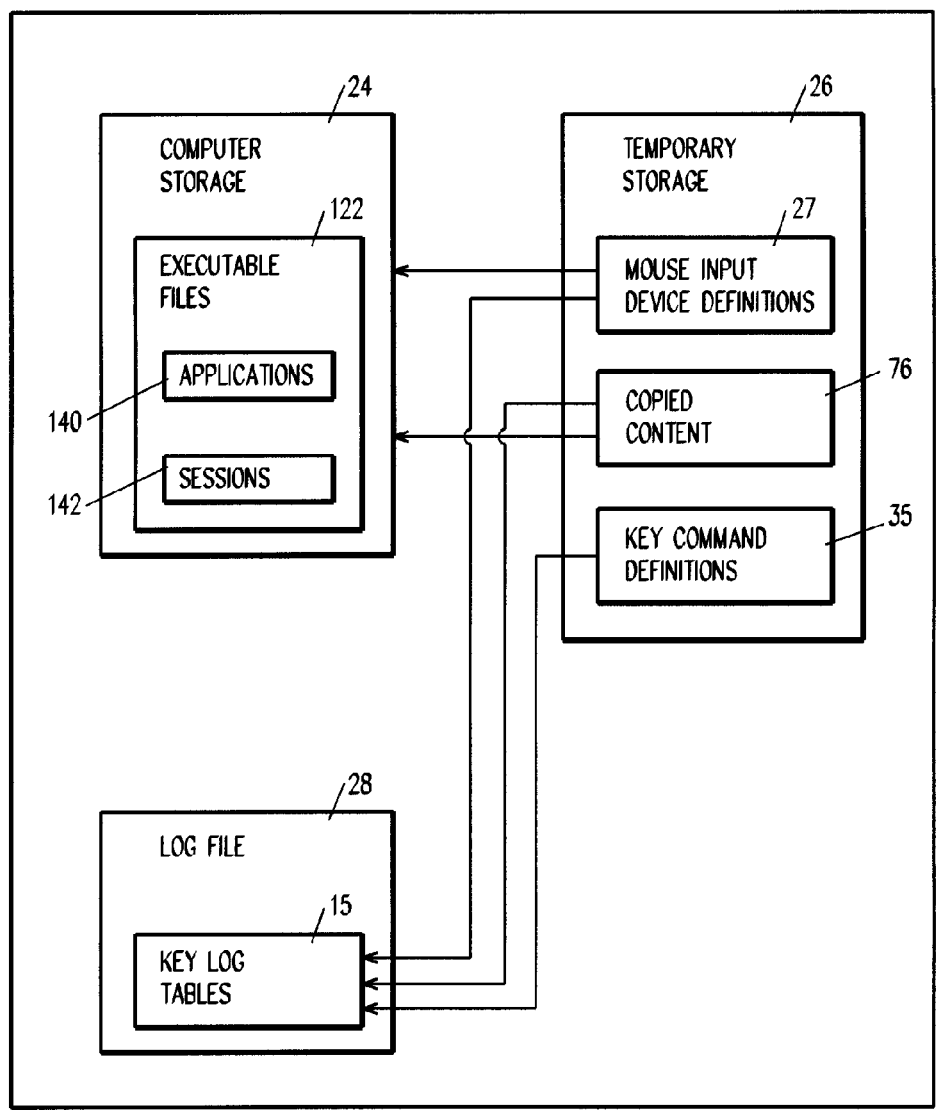
FIG. 10 illustrates a system including a program storage device in accordance with the present invention.

Referring to FIG. 10, the various logs and tables of an exemplary embodiment of the invention are set forth. Computer memory space 55 includes computer storage 24, temporary storage 26, and log file 28.

Computer storage, or memory, 24 provides storage for a user's executable files 122, including applications 140 and sessions 142. It receives and stores copied content from temporary memory 26.

Temporary storage 26 provides storage for mouse input device definitions 27, key command application definitions 35, and copied content 76.

Log file 28 provides storage for key log tables 15. Entered text 126 and mouse/cursor position data 128 is reconstructed in key logger 124 text reconstructor 132 responsive to mouse input device definitions 27, key command definitions 35, and copied content 76 from temporary storage 26 and stored in key log tables 15 in log file 28. A separate table 15 is created in log 28 for each active application 104, 140, and each stores all key log and mouse log information from storage 26 before the information is consolidated for a final log 28. Referring to FIG. 3, window 72 is the window of, for example, an Internet browser. Typically, the URL of this browser window is stored in table 15. This URL can be derived from the GUI, as the URL is visible in the browser window 72. Alternatively, the URL can be derived from the hyperlink or text entered by the user that opened that browser window 72.

Mouse input device definitions 27 are obtained from top layer 114 of application code 140 and stored to temporary storage 26.

Key command application definitions 35 are stored in temporary storage 26. This is storage for special actions, including the list of definitions prepared by process 200. These are actions that can be triggered by the mouse, which are characteristics of user application 140.

Referring to FIG. 9, step 500 starts an optional process for translation of actions triggered by a mouse 40 into script for logging in the key log database 28. In step 510, executable files 122 on the user's system memory 24 are located, as well as icons 84, 86 that link to these executable files. These may be, for example, .com or .bat files, and also files that open up functions of the operating system like Windows Explorer.

In step 520 the instruction that needs to be entered in the operating system to execute the same file is derived. For example, autoexec.bat can be executed by typing its location and file name in the Window's start/run function.

In step 530, the file name and icons that refer to it are registered along with the instruction that executes that file. This information is stored in a database 45 for access by the logging system to log script instructions that were initiated by the mouse. This database 45 is used to identify the executable program or document from within the computer's operating system. It is now possible to determine what icons the user selects to launch a new application. that information is needed for completeness of the final log 28. For instance, it makes a difference if an instruction is entered into an MS DOS command prompt, or in a text document. This tracking of what executable files are executed by using the mouse allows to make that distinction and possibly reconstruct those actions.

Step 540 ends the process.

ADVANTAGES OVER THE PRIOR ART

It is an advantage of the present invention that there is provided a system and method for tracking and synchronizing user input including mouse actions and keyboard logging.

ALTERNATIVE EMBODIMENTS

Figure 11:
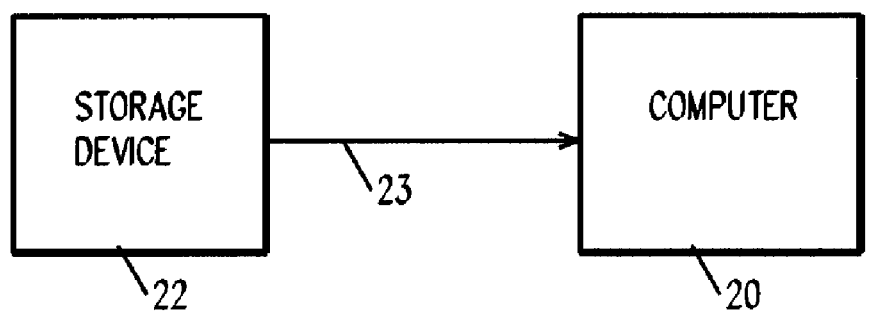
FIG. 11 illustrates a system in accordance with an embodiment of the present invention.

It will be appreciated that, although specific embodiments of the invention have been described herein for purposes of illustration, various modifications may be made without departing from the spirit and scope of the invention. Referring to FIG. 11, in particular, it is within the scope of the invention to provide a computer program product or program element, or a program storage or memory device 22, 23 such as a solid or fluid transmission medium, magnetic or optical wire, tape or disc, or the like, for storing signals readable by a machine 20, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, PI/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

What is claimed is:

1. A method for monitoring text input from a keyboard and from a pointing device during operation of a plurality of currently active applications and for a plurality of sessions within at least one of said applications, comprising:

establishing a database including a key log table for each said application, said key log table including fields identifying for each command action a session identifier, text logged, start time, end time, cursor position and mouse action;

monitoring input from a user keyboard for entry of text and cursor controls;

monitoring input from a pointing device;

logging keyboard entered text to said key log table;

responsive to input selectively from said pointing device and keyboard selectively signaling one of a copy, cut and paste block command action, determining text contents corresponding to said command action and logging said text contents to said key log table in sequence with said keyboard entered text;

responsive to a command action, building from said key log table for a given application a reconstructed log table combining text resulting from an interrupted session, whereby two broken pieces listed in the key log table are combined and listed as one entry in the reconstructed log table; and presenting at a user interface combined text from said reconstructed log table to a field of said given application.

2. The method of claim 1, said command action selectively representing a switch action, said switch action being at least one of an application and session switch.

3. The method of claim 2, responsive to said command action representing a copy, cut, or paste action, determining beginning and ending positions of said text contents selectively from position of said pointing device and cursor controls.

4. The method of claim 3, responsive to said command action representing a switch action, logging said application or session switch action to said key log in sequence with said keyboard entered text.

5. The method of claim 4, further comprising:

for each active application, logging key command application definitions and mouse input device definitions to temporary storage;

with each said block action and switch action, logging an event to a work log, said event including indicia identifying for said action an application, a session, a start time, an end time, cursor position at said start time, cursor position at said end time, pointing device action, and logged text; and building said key log from said work log.

* * * * *